United States Patent
Rub et al.

(10) Patent No.: US 6,201,840 B1
(45) Date of Patent: Mar. 13, 2001

(54) METHOD AND APPARATUS FOR DETECTING DATA IN MAGNETIC RECORDING USING DECISION FEEDBACK

(75) Inventors: Bernardo Rub, Edina; Hamid R. Shafiee, Bloomington, both of MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/150,843

(22) Filed: Sep. 10, 1998

Related U.S. Application Data

(60) Provisional application No. 60/062,662, filed on Oct. 8, 1997.

(51) Int. Cl.[7] .................................................. H03D 1/00
(52) U.S. Cl. ........................................... 375/341; 714/795
(58) Field of Search .................................. 375/262, 265, 375/340, 341; 714/789, 791, 794, 795

(56) References Cited

U.S. PATENT DOCUMENTS

| | | | |
|---|---|---|---|
| 4,571,734 | 2/1986 | Dolivo et al. | 375/18 |
| 4,802,174 * | 1/1989 | Hiraiwa et al. | 714/789 |
| 5,081,651 | 1/1992 | Kubo | 375/94 |
| 5,121,262 | 6/1992 | Squires et al. | 360/46 |
| 5,291,499 | 3/1994 | Behrens et al. | 371/43 |
| 5,311,376 | 5/1994 | Joan et al. | 360/51 |
| 5,341,249 | 8/1994 | Abbott et al. | 360/46 |
| 5,341,386 | 8/1994 | Shimoda et al. | 371/43 |
| 5,341,387 | 8/1994 | Nguyen | 371/45 |
| 5,349,608 | 9/1994 | Graham et al. | 375/94 |
| 5,355,261 | 10/1994 | Taratorin | 360/53 |
| 5,383,064 | 1/1995 | Harman | 360/45 |
| 5,390,198 | 2/1995 | Higgins | 371/43 |
| 5,440,588 | 8/1995 | Murakami | 375/341 |
| 5,452,943 | 9/1995 | Satomura | 341/58 |
| 5,454,014 | 9/1995 | Blaker et al. | 375/341 |
| 5,486,956 | 1/1996 | Urata | 360/65 |
| 5,502,735 | 3/1996 | Cooper | 371/43 |
| 5,521,767 | 5/1996 | Weng et al. | 360/46 |
| 5,521,945 | 5/1996 | Knudson | 375/341 |
| 5,553,169 | 9/1996 | Mizuoka | 382/282 |
| 5,576,707 | 11/1996 | Zook | 341/58 |
| 5,583,889 * | 12/1996 | Citta et al. | 375/341 |
| 5,586,128 | 12/1996 | Chen | 371/43 |
| 5,588,011 | 12/1996 | Riggle | 371/43 |
| 5,787,127 * | 7/1998 | Ono et al. | 375/341 |
| 5,809,044 * | 9/1998 | Todoroki | 714/786 |
| 5,841,478 * | 11/1998 | Hu et al. | 348/426 |
| 5,859,861 * | 1/1999 | Oh | 714/795 |

FOREIGN PATENT DOCUMENTS

| | | |
|---|---|---|
| 0 087 907 | 9/1983 | (EP) . |
| 0 581 717 A2 | 2/1994 | (EP) . |
| WO 96/24932 | 8/1996 | (WO) . |

OTHER PUBLICATIONS

"Implementation of PRML in a Rigid Disk Drive" by J.D. Coker et al., *IEEE*, vol. 27, No. 6, Nov. 27, 1991, pp. 4538–4543.

(List continued on next page.)

Primary Examiner—Young T. Tse
(74) Attorney, Agent, or Firm—Joseph R. Kelly; Westman, Champlin & Kelly, P.A.

(57) ABSTRACT

The present invention provides a method and apparatus for detecting data received from a magnetic storage channel having a channel pulse response represented by a polynomial including intersymbol interference (ISI) terms. The detector includes a Viterbi detector corresponding to a trellis structure having states connected by branches having associated branch metrics. In one embodiment, the Viterbi detector includes a branch metric calculator component configured to calculate a branch metric associated with each of the plurality of branches by removing a contribution to the branch metric associated with a predetermined ISI term.

18 Claims, 7 Drawing Sheets

OTHER PUBLICATIONS

Lineu C. Barbosa, "Maximum Likelihood Sequence Estimators: A Geometric View," *IEEE Transactions on Information Theory*, vol. 35, No. 2, pp. 419–427, Mar. 1989.

Robert W. Hawley, Thu–ji Lin and Henry Samueli, "A 300 MHz Digital Double–Sideband to Single–Sideband Converter in 1 µm CMOS", *IEEE Journal of Solid–State Circuits*, vol. 30, No. 1, pp. 4–10, Jan. 1995.

Kelly J. Knudson, Jack K. Wolf and Laurence V. Mistein, "Dynamic Threshold Implementation of the Maximum-–Likelihood Detector for the EPR4 Channel", *Proceedings of Globecom 91, IEEE Communications Society*, pp. 2135–2139, Dec. 1991.

M. Kobayashi et al., "Beyond I um$^2$/bit High Density Recording with Improved QAM Technique," *IEEE Transactions on Consumer Electronics*, vol. 37, No. 3, pp. 283–290, Aug. 1991.

Edward A. Lee and David G. Messerschmitt, *Digital Communication*, published by Kluwer Academic Publishers, pp. 275–286, 1988.

"A High Dimensional Signal Space Implementation of FDTS/DF" by Barrett Brickner and Jaekyun Moon, *IEEE Transactions on Magnetics*, vol. 32, No. 5, Sep. 1996, pp. 3941–3943.

"Maximum Transition Run Codes for Data Storage Systems" by Jaekyun Moon and Barrett Brickner, *IEEE Transactions on Magnetics*, vol. 32, No. 5, Sep. 1996, pp. 3992–3994.

"Signal Space Detectors for MTR–Coded Magnetic Recording Channels", by Hamid Shafiee et al., Manuscript received Jun. 16, 1997.

John G. Proakis, Ph.D., P.E., "Digital Communications" Second Edition, *McGraw–Hill Book Company*, 1985, pp. 554–561.

R. Behrens and A. Artstrong, "An advanced read/write channel for magnetic disk storage", Proceedings of the IEEE Asilomar Conference on Signals, Systems and Computer, 1992, pp. 956–960.

Brickner and J. Moon, "Design of a rate 6/7 maximum transition run code", *IEEE Trans. Mag*, vol. 33 (5 pt 1) Sep. 1997, pp. 2749–2751.

Bliss, "An 8/9 rate time–varying trellis code for high density magnetic recording", Digests of Intermag 1997.

* cited by examiner

METHOD AND APPARATUS FOR DETECTING DATA IN MAGNETIC RECORDING USING DECISION FEEDBACK

REFERENCE TO RELATED APPLICATION

The present application claims priority from provisional application Ser. No. 60/062,662 filed on Oct. 8, 1997.

FIELD OF THE INVENTION

The present invention relates to disc drives. More particularly, the present invention relates to a simplified detector for detecting data in a high order partial response channel.

BACKGROUND OF THE INVENTION

A typical disc drive includes one or more discs mounted for rotation on a hub or spindle. A typical disc drive also includes a transducer supported by a hydrodynamic air bearing which flies above each disc. The transducer and the hydrodynamic air bearing are collectively referred to as a data head. A drive controller is conventionally used for controlling the disc drive based on commands received from a host system. The drive controller controls the disc drive to retrieve information from the discs and to store information on the discs.

In one conventional disc drive, an electromechanical actuator operates within a negative feedback, closed-loop servo system. The actuator moves the data head radially over the disc surface for track seek operations and holds the transducer directly over a track on the disc surface for track following operations.

Information is typically stored in concentric tracks on the surface of the discs by providing a write signal to the data head to write information on the surface of the disc representing the data to be stored. In retrieving data from the disc, the drive controller controls the electromechanical actuator so that the data head flies above the disc, sensing the information on the disc, and generating a read signal based on the information. The read signal is typically conditioned and then decoded by the drive read/write channel and the controller to recover the data.

A typical data storage channel includes the disc, the data head, automatic gain control circuitry, a low passfilter, an analog-to-digital converter, a data detector, and a decoder. The read channel can be implemented either as discrete circuitry, or in a drive controller associated with the disc drive. Such a drive controller typically includes error detection and correction components as well.

A Viterbi detector has been used in the past as a data detector in a disc drive read channel. A Viterbi detector acts as a maximum-likelihood sequence estimator when the input to the detector consists of a signal plus additive white, Gaussian noise, and when a typical branch metric (e.g., the square of the error in the signal provided to the detector) is used.

In digital magnetic recording, the pulse response of the channel has conventionally been equalized to a suitable partial response (PR) target of the form $(1-D)(1+D)^n$, wherein n is a non-negative integer and D is a delay operator. A number of different PR targets have been developed. For example, when n=1, 2, 3, and 4 the resulting PR targets are referred to as various forms of a partial response class 4 (PR4) channel, specifically PR4, EPR4, $E^2$PR4 and $E^3$PR4 channels, respectively.

By limiting the length of the channel pulse response, such an equalization allows practical application of maximum likelihood (ML) detection utilizing the Viterbi algorithm. Magnetic recording read channels which recover recorded data bits through PR4 equalization followed by maximum likelihood detection, are commonly referred to as PRML channels.

As linear recording density on magnetic media increases, the flux reversals encoded on the magnetic medium are recorded closer to one another, and therefore interfere with one another in a manner referred to as intersymbol interference. Equalizing the channel pulse response (in such high density systems) to a low order PR4 polynomial results in significant, and undesirable, noise enhancement. Thus, equalization to a higher order channel target represented by a higher order PR polynomial becomes more suitable.

Increasing the order of the PR polynomial, however, also increases the complexity of the corresponding Viterbi detector. Operation of the Viterbi detector, as is generally known, is represented by a state or trellis diagram which can be written in a discrete time manner in which a set of all states in the state diagram are represented at different discrete time periods, with branches connecting the various states in the discrete time periods. The number of required states in the Viterbi detector used to detect data equalized to a PR polynomial target is given by $2^{(L-1)}$, where L is the length of the channel pulse response. For example, as the equalization target is changed from an EPR4 target to an $E^2$PR4 target, n is increased from 2 to 3. Thus, the length of the channel pulse response (L) is increased from 4 to 5 and, consequently, the number of Viterbi states is doubled from $2^{4-1}=8$ to $2^{5-1}=16$.

For certain higher order partial response targets, such as the $E^2$PR4 and $E^3$PR4 targets, it has been observed that the dominant error events are +/−(2, −2, 2) when the input bits are +1 or −1. Such dominant error events typically result from a shifted tribit, or a quadbit mistaken as a dibit, or vice versa. It has also been shown that a (1, 7) run length limited (RLL) modulation code removes such dominant error events. Such a code thus increases the minimum Euclidean distance of the channel for higher order PR channels such as the $E^2$PR4 channel. However, the 2/3 rate of the (1, 7) code is disadvantageous when compared with codes with higher rates used in PRML systems. These dominant error events can be removed if the (1, 7) RLL code is replaced with a maximum transition run (MTR) code. An MTR=2 code limits the run of consecutive transitions to 2, and therefore, removes all tribits from the input data string. Run length limited modulation codes are discussed in R. Behrens and A. Armstrong, "An Advanced Read/Write Channel For Magnetic Disc Storage", *Proceedings of the IEEE Assilmar Conf. On Signals, Systems and Computers*, 1992, pp. 956–960. In addition, MTR codes are discussed in Moon and B. Brickner, "Maximum Transition Run Codes For Data Storage Systems", *IEEE Trans. Magn.*, Vol. 32, No. 5, pp. 3992–3994, September 1996.

The present invention addresses the problem of increased detector complexity which comes with equalizing a channel to a higher order partial response polynomial. The present invention also addresses other problems, and offers other advantages over the prior art.

SUMMARY OF THE INVENTION

Time varying code constraints also have recently been investigated. Relaxation of the MTR code constraint allows tribits to start at alternate time intervals. Using such a time-varying MTR (TV-MTR) constraint allows the implementation of codes having rate 8/9.

In order to realize the modulation coding gain, the code constraints need to be enforced in the detector. For example, with the (1, 7) RLL code, enforcement of the code constraints reduces the number Viterbi states in the $E^2PR4$ channel from 16 to 10. With an MTR=2 code, the two states in the $E^2PR4$ trellis which correspond to the presence of a tribit are removed. With a TV-MTR code, these two states are removed at every other time interval. When an MTR=2 code is utilized in an $E^3PR4$ channel, the number of states is reduced from 32 to 26. Furthermore, four additional states become transitional states. With a TV-MTR code, two states are removed from the trellis at all times. Two more states are removed at even time intervals and two additional sates are removed at odd time intervals. Finally, four states become transitional states only when the presence of a tribit pattern is disallowed.

The present invention provides a detector for detecting data received from a magnetic storage channel having a channel pulse response represented by a polynomial including intersymbol interference (ISI) terms. The detector includes a Viterbi detector corresponding to a trellis structure having states connected by branches having associated branch metrics. In one embodiment, the Viterbi detector includes circuitry for calculating a branch metric associated with each of the plurality of branches which has a contribution to the branch metric associated with at least one ISI term removed.

DETAILED DESCRIPTION OF THE PREFERRED EMBODIMENTS

Figure 1:
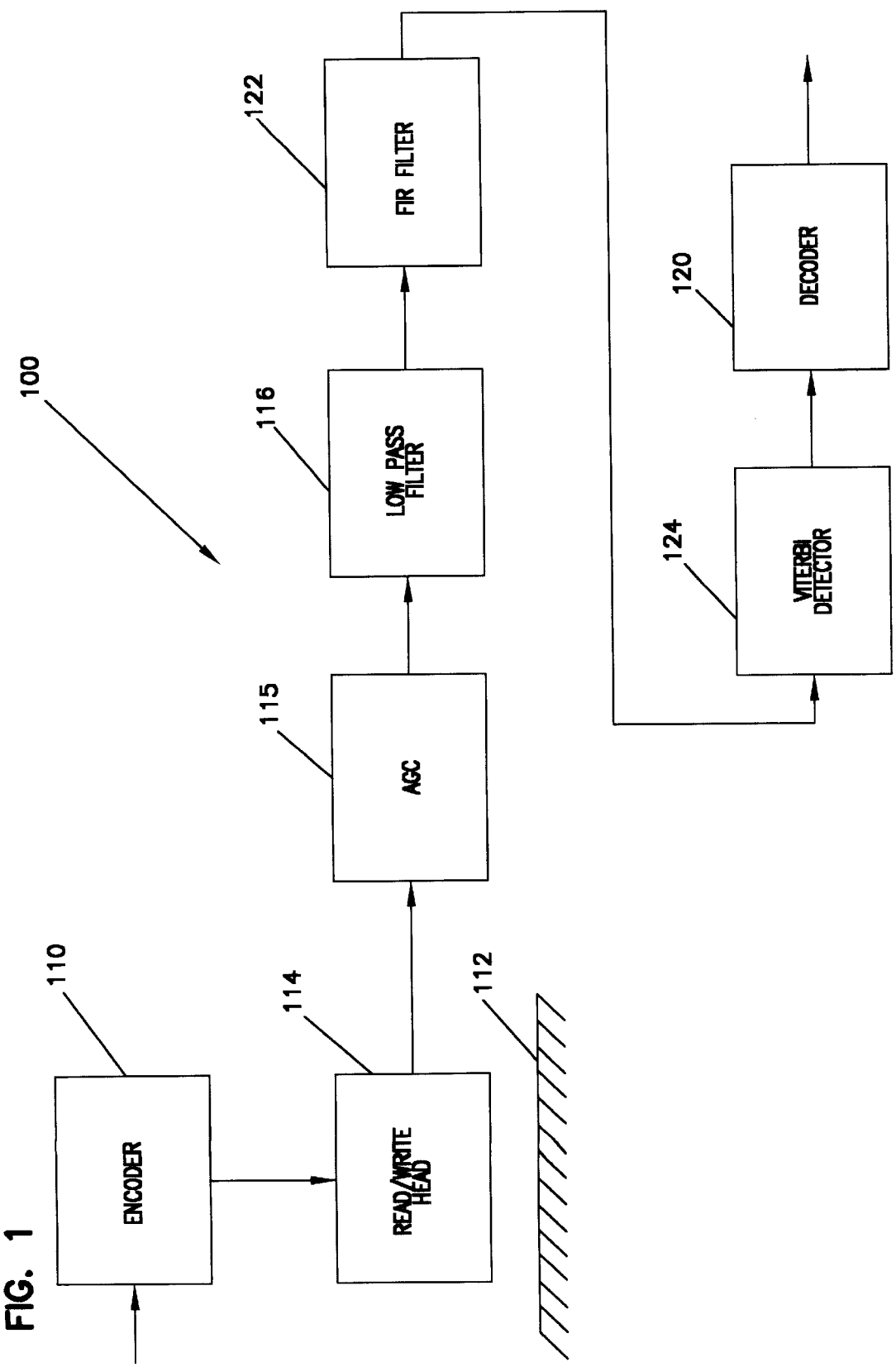
FIG. 1 is a simplified block diagram of a portion of a read back system used in a magnetic disc drive.

FIG. 1 is a simplified block diagram of a portion of a data storage system 100 according to the present invention. System 100 includes encoder 110, disc 112, read/write head 114, automatic gain control (AGC) circuit 115, low pass filter 116, finite impulse response (FIR) filter 122, Viterbi detector 124, and decoder 120. System 100 may also include an analog-to-digital (A/D) converter as well. An actuator assembly (not shown) typically holds read/write head 114 in position over a surface of disc 112. The actuator assembly includes actuator arms which are rigidly coupled to a head gimbal assembly. The head gimbal assembly, in turn, includes a load beam, or flexure arm, rigidly coupled to the actuator arm at a first end thereof, and to a gimbal at a second end thereof. The gimbal is coupled to an air bearing which supports read/write head 114 above the corresponding surface of disc 112 for accessing data within tracks on the surface of disc 112.

In operation, a drive controller associated with the disc drive containing system 100 typically receives a command signal from a host system which indicates that a certain portion of disc 112 is to be accessed. In response to the command signal, the drive controller provides a servo control processor with a position signal which indicates a particular cylinder over which the actuator is to position read/write head 114. The servo control processor converts the position signal into an analog signal which is amplified and provided to the actuator assembly. In response to the analog position signal, the actuator assembly positions read/write head 114 over a desired track.

If a write operation is to be performed, data is provided by the drive controller to encoder 110 which encodes the data according to a predetermined code. The code can be any suitable code, such as any of those mentioned above, or other codes. For example, such a code may include constraints such as a maximum transition run length code constraint of any desirable size (such as MTR=2). The code constraints may also be time varying. The encoded data is then provided, in the form of a write signal, to read/write head 114. Read/write head 114 then operates to encode flux reversals on the surface of disc 112 which are indicative of the data encoded, in the write signal.

If a read operation is to be executed, read/write head 114 develops a read signal indicative of information (e.g., flux reversals) on the track over which read/write head 114 is positioned. The read signal is provided to AGC circuit 115 which, maintains the signal within an expected range and provides it to low pass filter 116. Low pass filter 116 filters out high frequency components and provides the signal to FIR filter 122. FIR filter 122 is provided to equalize the input signal pulses to a target response (pulses which have fewer non-zero values).

Figure 2:
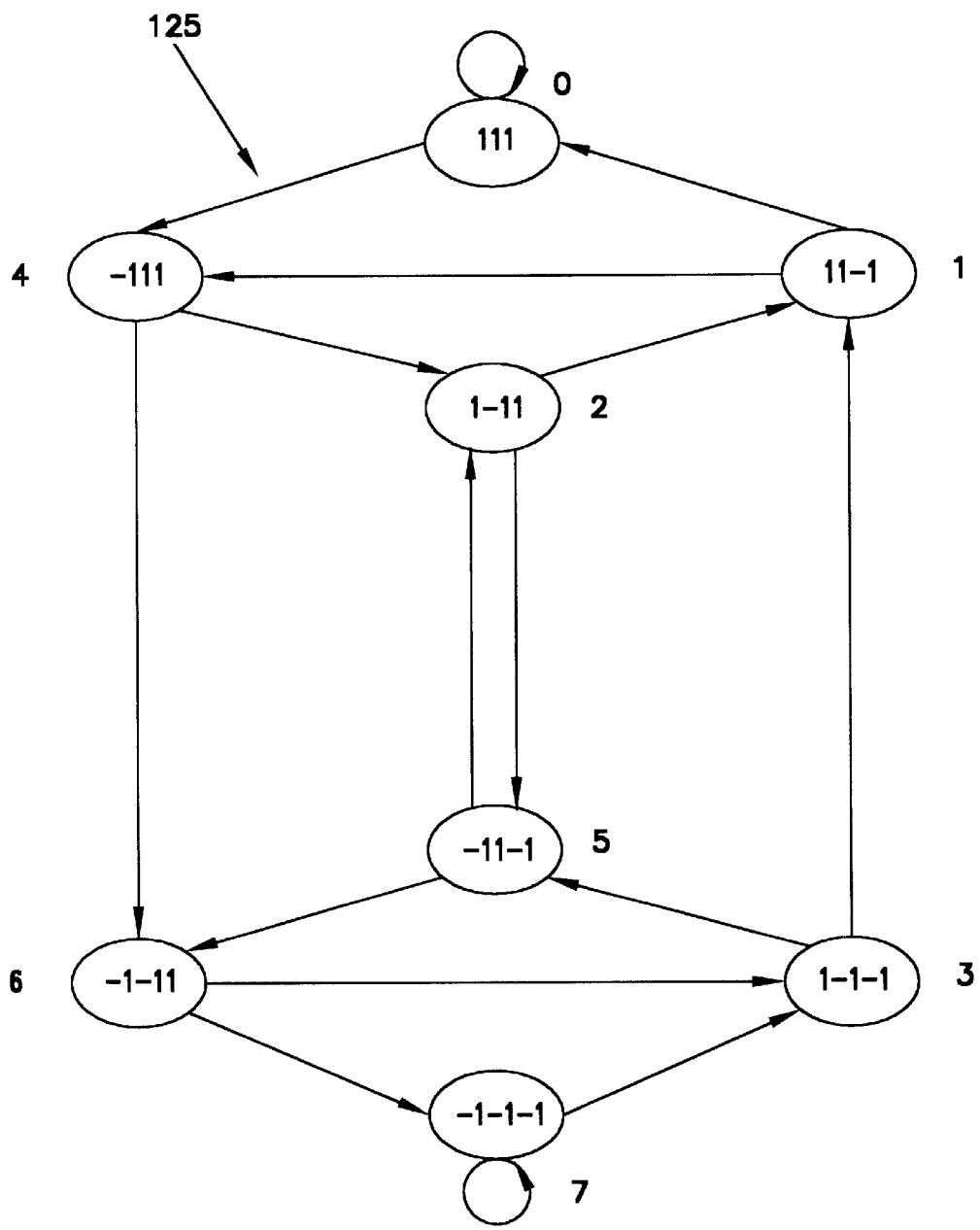
FIG. 2 is a state diagram illustrating operation of a Viterbi detector in accordance with one aspect of the present invention.

Normal operation of Viterbi detector 124 is more easily understood using a state diagram. For example, FIG. 2 shows a state diagram 125 illustrating the operation of Viterbi detector 124. If a user input bit of zero represents no transition or flux reversal read from disc 112, and a bit of one represents a transition (i.e., assuming a not return to zero inverse NRZI, coding system), and if the peak sampled value of the equalized transition is 1, then an input of 0 provides an output of 0, and an input of 1 provides an output of either 1 or –1. This depends on the polarity of the last transition. In other words, each time there is a one in the input sequence, the direction of the write current changes. Given the above system, it is clear that the polarities of transitions must alternate and as such the system outputs a 1 or –1 depending on whether the previous transition was a 1 or –1. In another embodiment, non-return to zero (NRZ) modulation is used. In such a system, a 1 corresponds to a high and 0 corresponds to a low.

All of these rules are captured in the state diagram 125 shown in FIG. 2. Such a state diagram can be used to illustrate the detector structure and to determine the noiseless output sequence for a sequence of input bits.

The particular state diagram 125 in FIG. 2 illustrates a full rate 8-state radix-2 Viterbi detector. Each state is labeled by a state index (0–7) located adjacent the state indicator circles in diagram 125. The numbers inside the states are representative of the last three input bits, input into the system. The states are connected by branches, each branch having an associated branch metric. In a typical Viterbi detector, the branch metric is calculated by subtracting a desired value for each branch from the received equalized value. This difference is squared and used as the branch metric.

Each state of the Viterbi detector is generally implemented as an add-compare-select (ACS) unit, which adds the branch metric associated with each incoming branch to the state metric corresponding to the state from which the branch originated, compares the two values associated with the two incoming branches, and selects the best value, as is generally known. Thus, the ACS unit essentially adds the branch metric associated with each branch to the total metric in that branch's corresponding path. The metrics from all incoming paths are then compared and the path with the best metric is selected. This selection essentially estimates, for the selected previous state, the value of one of the previous input bits. This value is stored in a survivor memory associated with the previous state.

Figure 3:
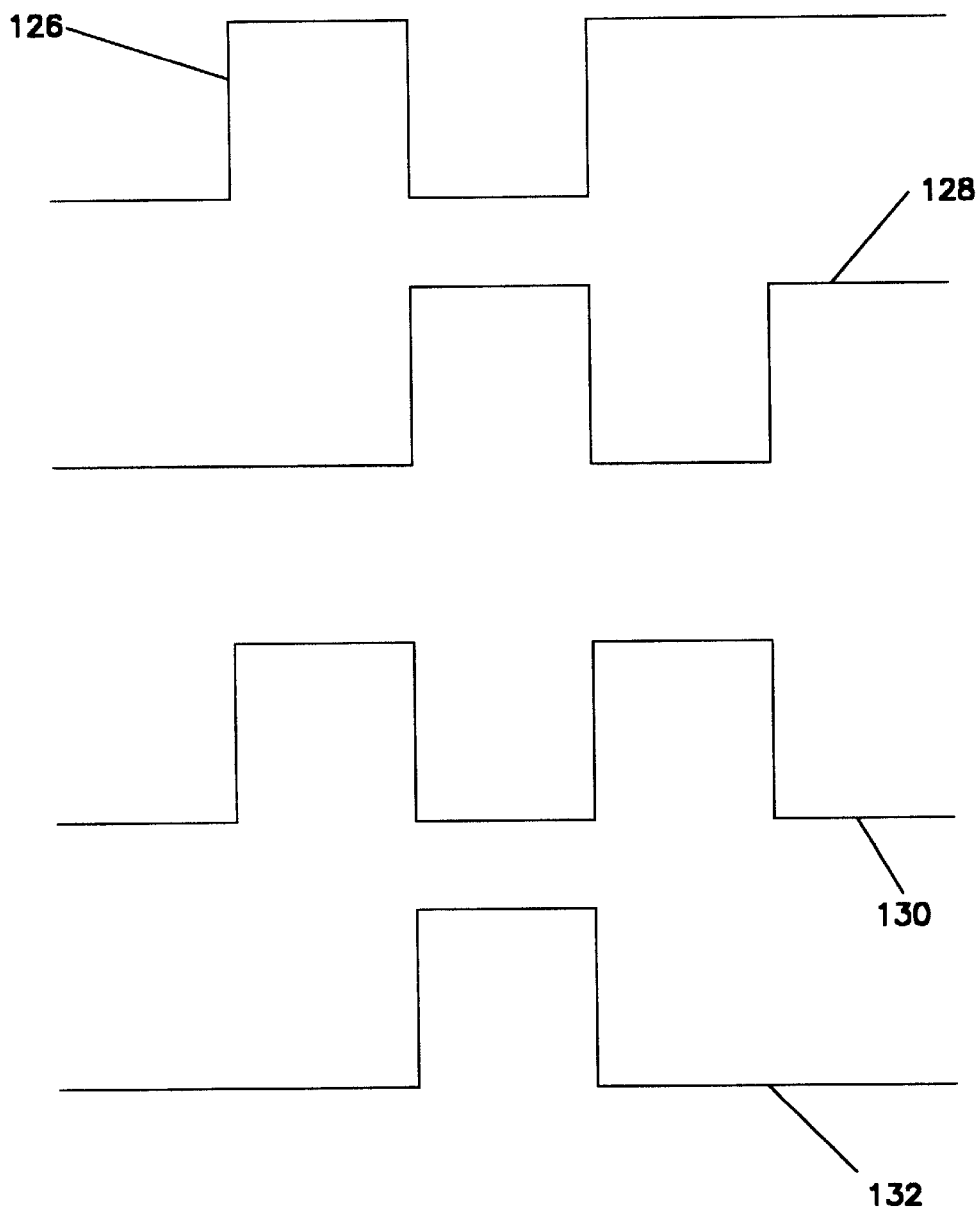
FIG. 3 illustrates waveforms showing dominant error events for higher order PR channels such as an $E^2PR4$ channel.

FIG. 3 illustrates dominant error events encountered by such Viterbi detectors applied to a high order PR target such as an $E^{2PR}4$ channel. FIG. 3 includes waveforms 126, 128, 130 and 132. Waveform 126 illustrates a tribit (i.e., a waveform having three consecutive transitions). Waveform 128 illustrates that the tribit of waveform 126 has been shifted to the right one temporal time interval. Where the tribit pattern of waveform 126 is actually written to the disc, but is erroneously read as a shifted tribit pattern of waveform 128, an error event arises. Subtracting waveform 126 from waveform 128 yields a value of (2, −2, 2).

Waveform 130 represents a quadbit (i.e., a waveform having four consecutive transitions). Waveform 132 represents the quadbit of waveform 130 which has mistakenly been read as a dibit (i.e., a waveform having only two consecutive transitions). Again, subtracting waveform 132 from waveform 130 yields a value of (2, −2, 2). These two error events represent two dominant events which cause errors in codes which allow more than two consecutive transitions. As described above, in order to address such error events, MTR codes are used. A relaxed time-variant MTR code allows waveforms having, for example, three transitions, but only allows those tribits to start once every L time intervals.

The present invention provides a Viterbi-type detector for detecting data equalized to a high order partial response channel. The present invention reduces the complexity of such a detector by removing the contribution of the last intersymbol interference (ISI) term by using local feedback. This reduces the effective length of the channel pulse response by 1, and thus cuts the number of states required in the Viterbi detector in half.

In order to do this, the Viterbi detector uses local feedback in order to remove the contribution of a last intersymbol interference (ISI) component. This reduces the effective length of the channel response by 1. Thus, the number of states in an associated Viterbi detector is cut in half. Implementation of the present invention on an $E^2PR4$ channel is discussed first.

Recall that partial response polynomials are generally of the form $(1-D)(1+D)^n$. Where n=3, the channel pulse response f(D) for the $E^2PR4$ target becomes (Eq. 1):

$$F(D)=1+2D-2D^3-D^4. \quad (Eq.\ 1)$$

where D denotes a delay operator.

The channel output sample $y_k$ at time k can be written as (Eq. 2):

$$y_k=a_k+2a_{k-3}-2a_{k-3}-a_{k-4} \quad (Eq.\ 2)$$

where $a_k \in \{+/-1\}$ denotes the encoded data sequence.

Since f(D) is a fourth order polynomial, it spans five intersymbol interference (ISI) terms (i.e., L=5). Thus, the algorithm used in a conventional Viterbi detector requires $2^{(5-1)}=16$ states. Each state of such a conventional Viterbi detector represents the past four write current input pulses denoted $(a_{k-1}, a_{k-2}, a_{k-3}, a_{k-4})$. To further simplify the detector structure in accordance with one aspect of the present invention, decision feedback is implemented in the $E^2PR4$ channel to form a new detector structure denoted by $E^2PR4/DF$. In such a detector structure, the ISI contribution of the $a_{k-4}$ term is removed from the received sample by using local feedback. Thus, ignoring error propagation effects, the equalized sample becomes (Eq. 3):

$$y^1{}_k=y_k+a_{k-4}=a_k+2a_{k-1}-2a_{k-3} \quad (Eq.\ 3)$$

This denotes an effective channel dibit response of the form shown in (Eq. 4):

$$g(D)=1+2D-2D^3 \quad (Eq.\ 4)$$

Figure 4:
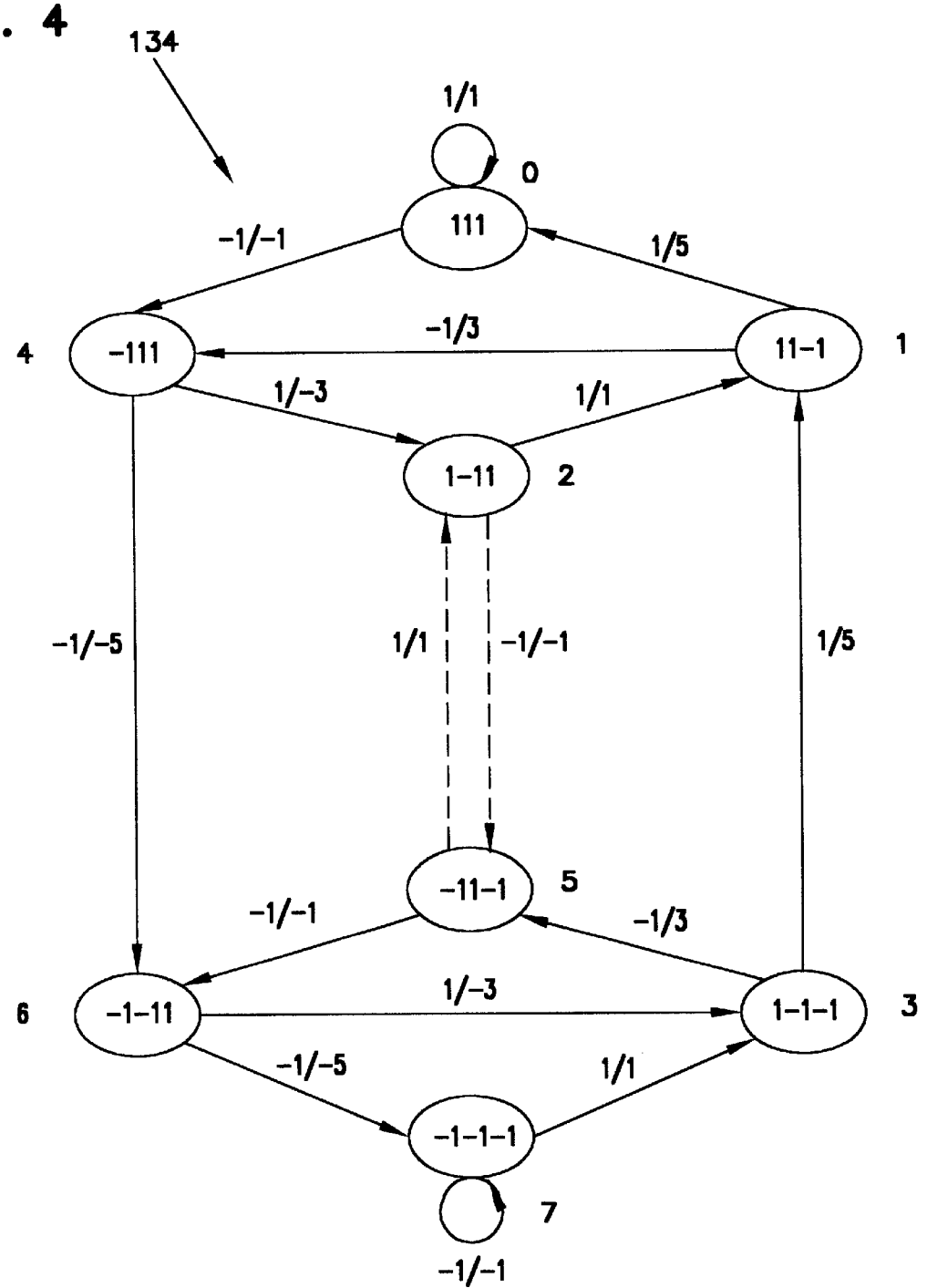
FIG. 4 is a state diagram illustrating the operation of a detector in accordance with one aspect of the present invention.

Since the new pulse response designated above spans only four previous prior write current inputs (i.e., L=4), and is thus represented by a third order polynomial, a Viterbi detector represented by a state diagram having only $2^{4-1}=8$ states is required, rather than 16 states as with a traditional Viterbi detector in an $E^2PR4$ channel. Such a state diagram is illustrated as state diagram 134 in FIG. 4 and represents a detector for a channel equalized to g(D) as shown above. As with the state diagram 125, illustrated in FIG. 2, each state in state diagram 134 has a corresponding state index numeral adjacent the corresponding state. Each state in state diagram 134 represents the last three input bits to the channel, denoted by $(a_{k-1}, a_{k-2}, a_{k-3})$. Furthermore, the value of $a_{k-2}$ has no bearing on the channel outputs since it is multiplied by zero in the corresponding PR polynomial. On every branch between the states in diagram 134, the input bit and the resulting channel output is shown.

It can be seen that, unlike a PR4 or an EPR4 target, removing the last ISI term of the $E^2PR4$ polynomial (or a higher order PR polynomial) leaves a significant majority of the channel energy in tact. For example, the total channel energy in an $E^2PR4$ polynomial can be designated by the number 10 which is the sum of the squares of the each of the coefficients. Removing the last ISI term only reduces the channel energy to 9, thus indicating a 10% reduction in the overall channel energy.

In order to remove the effect of the $a_{k-4}$ term, it should be noted that, at any given time k, the $a_{k-4}$ term must be available for branch metric computation. However, since the paths through the trellis corresponding to state diagram 134 have not possibly merged yet, contribution of the $a_{k-4}$ term can be removed using local feedback. In other words, for each branch in state diagram 134, the value of $a_{k-4}$ is retrieved from the survivor memory of its corresponding path. Therefore, for a branch which originates from state m, the channel output becomes that shown in (Eq. 5):

$$y_k^m = y_k + a_{k-4}^m \quad (Eq.\ 5)$$

where $$a_{k-4}^m$$

denotes the value of $a_{k-4}$ stored in the survivor memory associated with path m. For an $E^2PR4/DF$ detector in accordance with one aspect of the present invention. A branch metric is denoted by $$\Delta_k^{m,n},$$

where m and n specify past and future states, respectively. The branch metric can by calculated as (Eq. 6):

$$\Delta_k^{m,n} = \left(y_k^{\prime m} - d_k^{\prime m,n}\right)^2 = (y_k - d_k^{m,n})^2 \qquad (\text{Eq. 6})$$

where $$d_k^{m,n}$$

denotes the corresponding desired value for the given branch, and:

$$d_k^{m,n} = d_k^{\prime m,n} - a_{k-1}^m \qquad (\text{Eq. 7})$$

The total metric for state n, denoted by $$\beta_k^n$$

can be calculated as follows:

$$\beta_k^n = \min\{(\beta_{k-1}^{m1} + \Delta_k^{m1,n}), (\beta_{k-1}^{m2} + \Delta_k^{m2,n})\} \qquad (\text{Eq. 8})$$

where $$\beta_{k-1}^{m1}$$

represents state metric for the state from which the first path leading to the current state originates, and $$\beta_{k-1}^{m2}$$

represents the state metric for the state from which the second path leading to the current state originates.

The branch metrics for all states can be further simplified. For example, Table 1 illustrates branch metrics for an $E^2PR4/DF$ detector in accordance with one aspect of the present invention. Table 1 includes a number of columns designating a state index, the state (illustrating the input bits corresponding to $a_{k-1}$, $a_{k-2}$ and $a_{k-3}$), a first previous state having a branch connected to the current state, the desired value associated with the branch metric for the branch originating from state m1 where $a_{k-4}=1$ and where $a_{k-4}=-1$, the calculated branch metric for the branch originating from state m1 where $a_{k-4}=1$ and $a_{k-4}=-1$, a second previous state m2 having a branch leading to the current state, and the desired value and branch metrics associated with that branch where $a_{k-4}=1$ and $a_{k-4}=-1$. To simplify the notation in Table 1, the metrics for all possible desired values for and $E^2PR4/DF$ channel are computed and shown below where $$A_k^d,$$

denotes the metric for a branch whose corresponding desired value is d.

| $A_k^0 = 0$, | $A_k^4 = -2y_k + 4$, | $A_k^6 = -3y_k + 9$, |
|---|---|---|
| $A_k^2 = -y_k + 1$, | $A_k^{-4} = 2y_k + 4$, | $A_k^{-6} = 3y_k + 9$, |
| $A_k^{-2} = y_k + 1$, | | |

| | | | $a_{k-4} = 1$ | $a_{k-4} = -1$ | | $a_{k-4} = 1$ | $a_{k-4} = -1$ |
|---|---|---|---|---|---|---|---|
| State Index | State ($a_{k-1}$, $a_{k-2}$, $a_{k-3}$) | $m_1$ | $d_k$ $\Delta_k^{m1,n}$ | $d_k$ $\Delta_k^{m1,n}$ | $m_2$ | $d_k$ $\Delta_k^{m2,n}$ | $d_k$ $\Delta_k^{m2,n}$ |
| 0 | (1, 1, 1) | 0 | 0 $A_k^0$ | 2 $A_k^2$ | 1 | 4 $A_k^4$ | 6 $A_k^6$ |
| 1 | (1, 1, -1) | 2 | 0 $A_k^0$ | 2 $A_k^2$ | 3 | 4 $A_k^4$ | 6 $A_k^6$ |
| 2 | (1, -1, 1) | 4 | -4 $A_k^{-4}$ | -2 $A_k^{-2}$ | 5 | 0 $A_k^0$ | 2 $A_k^2$ |
| 3 | (1, -1, -1) | 6 | -4 $A_k^{-4}$ | -2 $A_k^{-2}$ | 7 | 0 $A_k^0$ | 2 $A_k^2$ |
| 4 | (-1, 1, 1) | 0 | -2 $A_k^{-2}$ | 0 $A_k^0$ | 1 | 2 $A_k^2$ | 4 $A_k^4$ |
| 5 | (-1, 1, -1) | 2 | -2 $A_k^{-2}$ | 0 $A_k^0$ | 3 | 2 $A_k^2$ | 4 $A_k^4$ |
| 6 | (-1, -1, 1) | 4 | -6 $A_k^{-6}$ | -4 $A_k^{-4}$ | 5 | -3 $A_k^{-2}$ | 0 $A_k^0$ |
| 7 | (-1, -1, -1) | 6 | -6 $A_k^{-6}$ | -4 $A_k^{-4}$ | 7 | -2 $A_k^{-2}$ | 0 $A_k^0$ |

In Table 1, in order to simplify the branch metrics, the $y_k^2$ terms (which are common to all branch metrics) are subtracted from all branch metrics. The resulting branch metrics are also divided by four. The calculated branch metrics illustrate that six non-zero branch metrics need to be computed which are given by $+/-y_k+1$, $+/-2y_k+4$ and $+/-3y_k+9$. It can be seen that each of the branch metrics accounts for the $$a_{k-4}^{\prime\prime\prime}$$

values (i.e., the first bit stored in the survivor memory associated with path m).

The state diagram 134 which illustrates operation of the $E^2PR4/DF$ channel is modified to reflect the modulation code constraint for an MTR=2 code. Thus, the connections between states 2 and 5 are shown by dotted lines to indicate that in an MTR=2 code, these transitions (which correspond to tribit patterns) are illegal and removed. The branch metrics corresponding to these transitions are also marked in Table 1. In addition, the metrics in Table 1 marked by + can be ignored because the corresponding patterns are removed from the trellis diagram at an earlier time interval. Specifically, for the branch that originates from state 2 and ends in state 1, $a_{k-4}$ must be 1, since if $a_{k-4}=-1$, this would correspond to the presence of a tribit. Similarly, for the branch that emanates from state 5 and leads to state 6, only the metric corresponding to $a_{k-4}=-1$ is needed.

With a time varying MTR code, the transitions between states 2 and 5 are permitted at every other time interval to allow for the presence of a tribit. The two metrics marked only with a + are ignored at the remaining time intervals.

Figure 5:
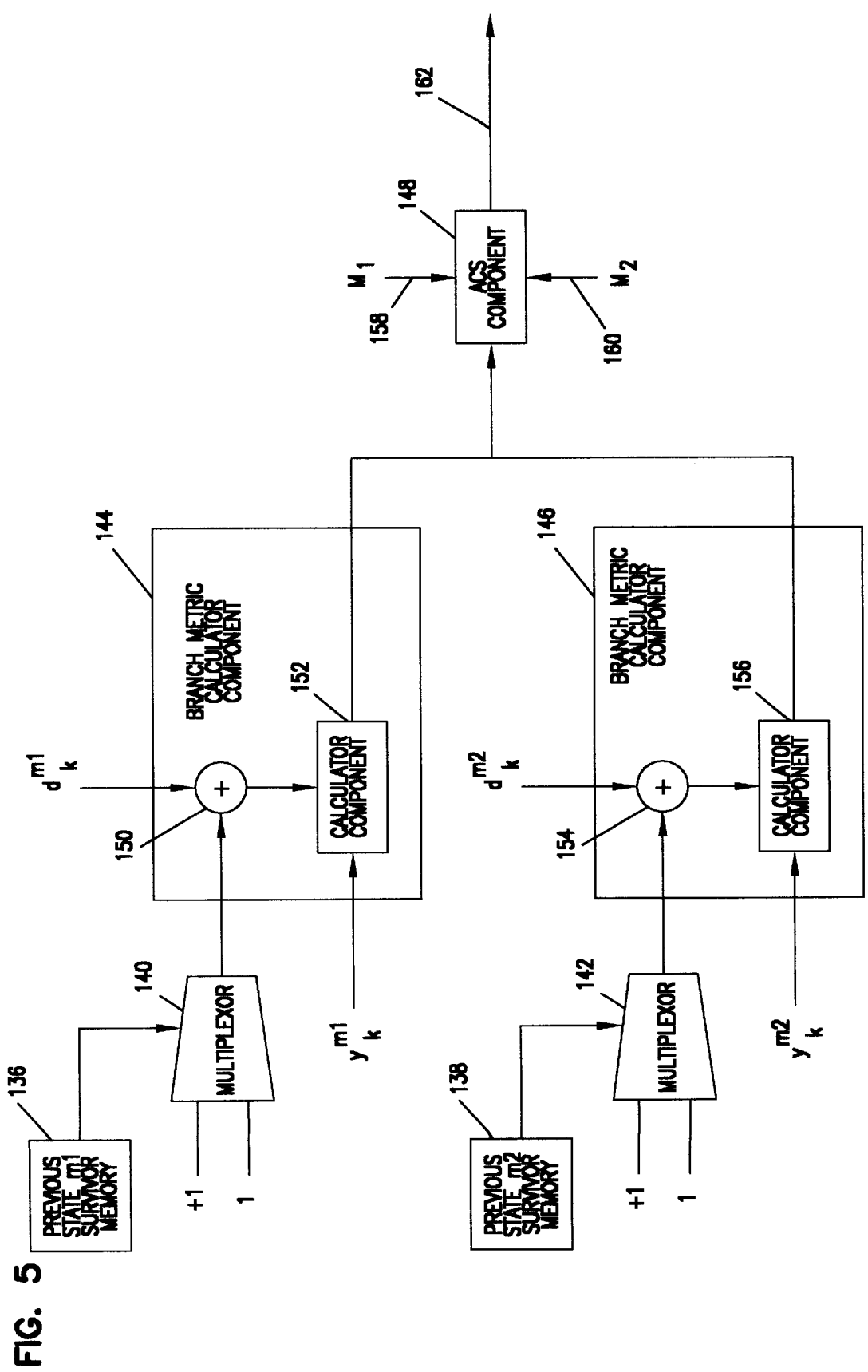
FIG. 5 is a more detailed block diagram of a portion of the detector in accordance with one aspect of the present invention.
Figure 6:
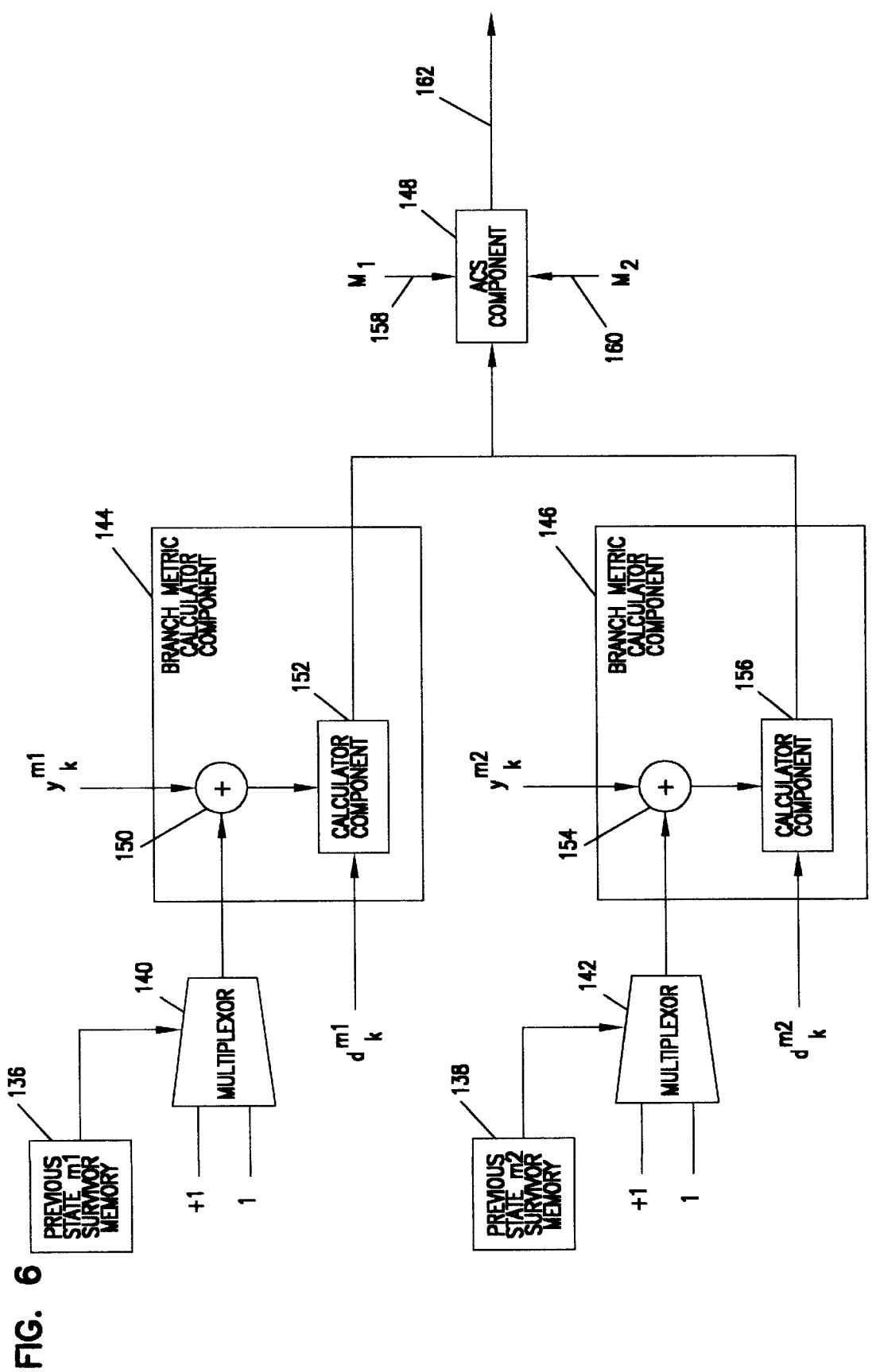
FIG. 6 is a more detailed block diagram of another embodiment of a portion of the detector in accordance with one aspect of the present invention.

FIGS. 5 and 6 illustrate two embodiments of a portion of Viterbi detector 124 which accounts for term $a_{k-4}$ in this fashion. FIG. 5 illustrates a survivor memory associated with previous states m1 and m2 which have branches leading to the current state, and designated 136 and 138, respectively. FIG. 5 also illustrates input multiplexers 140 and 142, branch metric calculation components 144 and 146 for calculating branch metrics associated with the branches originating from states m1 and m2, respectively, and add-compare-select (ACS) component 148. Branch metric calculation component 144 includes summing component 150 and calculation component 152. Branch metric calculation component 146 includes summing component 154 and calculation component 156.

The current sample $y_k$ associated with branch m1 is provided to calculator component 152. The desired value used in calculating the branch metric for the path originating from state m1 is provided to summing component 150. Input multiplexer 140 has, as its inputs, a +1 and a −1 value. The select input from multiplexer 140 receives a signal from the previous state survivor memory 136. Thus, the value of $a_{k-4}$ is used to select either the value +−1 in multiplexer 140.

The selected value is also provided to summing circuit 150. Summing circuit 150 combines the values input thereto in accordance with Equation 7 above and provides its output to calculator component 152. Calculator component 152 calculates the branch metric associated with branch m1 as illustrated in Equation 4 above and provides that branch metric to ACS component 148. The branch metric associated with branch m2 is calculated in a similar fashion, and will thus not be discussed in detail.

The previous state metrics associated with branches m1 and m2 are also provided as inputs to ACS component 148, at inputs 158 and 160, respectively. Based on the inputs, ACS component 148 adds the calculated branch metrics with the associated state metrics, for each branch, compares the two values, and selects the lowest value and provides it at its output 162, thus selecting the associated portion of the path through the state diagram (or trellis diagram) 134. ACS component 148 operates in a known manner.

FIG. 6 is a more detailed block diagram of a second embodiment of Viterbi detector 124 in accordance with one aspect of the present invention. A number of the items are similar to those shown in FIG. 5, and are similarly numbered. However, rather than accounting for the $a_{k-4}$ term by subtracting it from the dk desired value, as indicated in FIG. 5, the contribution associated with the $a_{k-4}$ term is accounted for by subtracting it from the $y_k$ input associated with the respective branch.

Thus, the $y_k^{m1}$ value is provided as one of the inputs into summing circuit 150, and the $d_k^{m1}$ term is provided as an input to calculator component 152. The output of summing component 150 provides a value indicated by Equation 5 above. Calculator component 152 then calculates the branch metric based on this value and the desired value $d_k^{m1}$ and provides the calculated branch metric as an input to ACS component 148. The branch metric for the branch originating from state m2 is calculated in a similar fashion.

As discussed above, the dominant error events for the $E^2PR4$ channel is +/−(2, −2, 2), which results in a minimum Euclidean distance ($d_{min}$) of $\sqrt{24}$. For an MTR-coded channel, the dominant error events become +/−(2) which yields a $d_{min}$ of $\sqrt{40}$. Therefore, for two channels at the same symbol density, the MTR code provides a 2.2 dB gain over the uncoded channel.

When used in conjunction with MTR codes, the dominant error event for the $E^2PR4/DF$ channel in accordance with the present invention remains the single length events of the form +/−(2). However, the minimum Euclidean distance is now $\sqrt{36}$. This means that, compared with an uncoded system at the same symbol density, a coding gain of 1.76 dB is obtained. The gain realized may be slightly less due to error propagation which results from cancellation of the ISI contribution of $a_{k-4}$ using local feedback. However, the Viterbi detector of the $E^2PR4/DF$ channel requires only, at most, 8 states rather than 16 states required for a conventional $E^2PR4$ channel.

Figure 7:
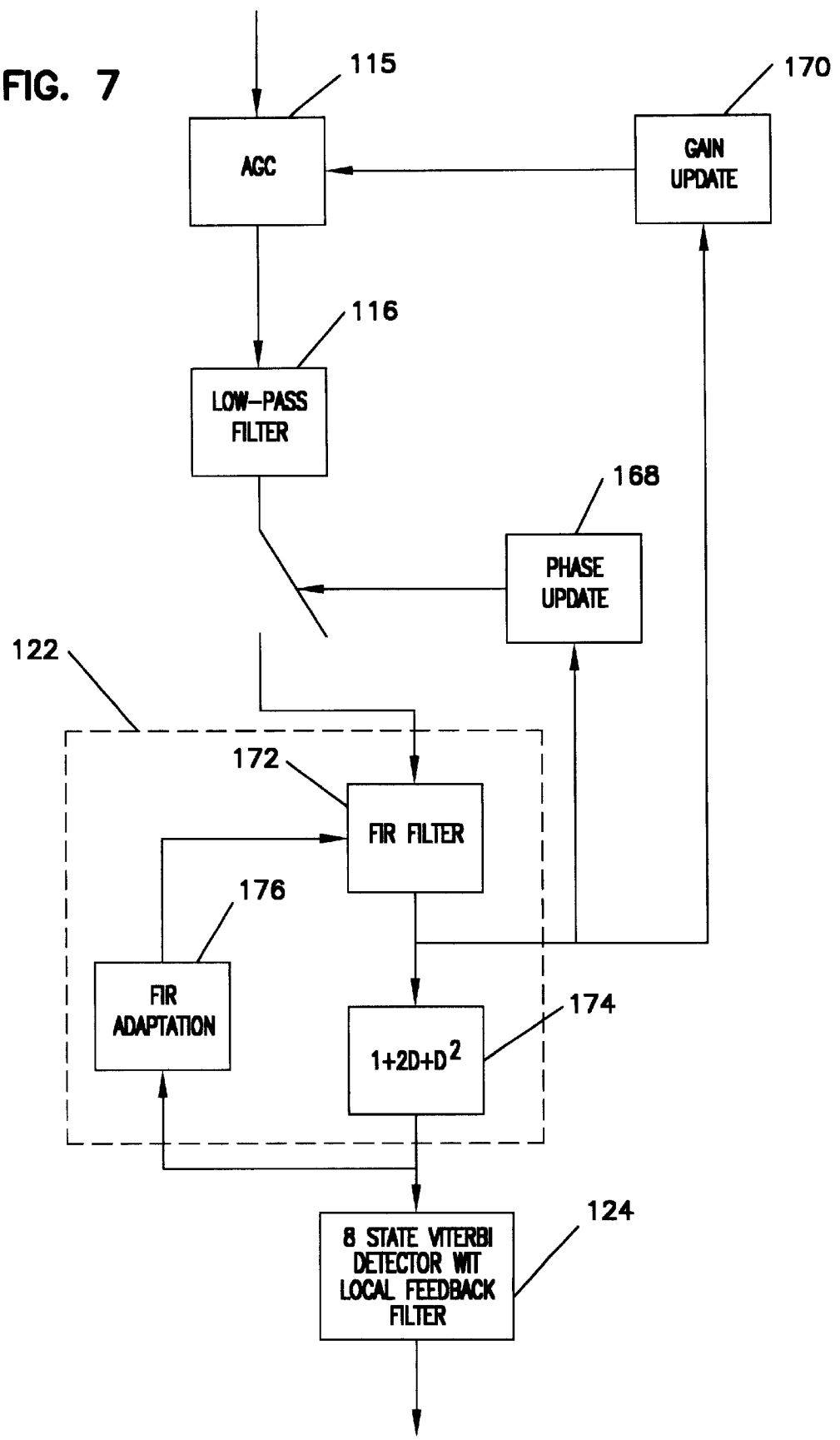
FIG. 7 is a more detailed block diagram of an example of a read channel illustrating a detector in accordance with one aspect of the present invention.

FIG. 7 illustrates an examplary diagram of a read channel in accordance with one aspect of the present invention. A number of items are similar to those shown in FIG. 1 and are similarly numbered. FIG. 7 illustrates a number of items in greater detail.

The channel includes automatic gain control component 115, low pass filter 116, phase update component 168 and gain update component 170. As discussed briefly above, (AGC) component 115 receives the read signal from read/write head 114. AGC component 115 operates in a known fashion in order to adjust the gain of an amplifier amplifying the read signal to bring the read signal into an expected range. Low pass filter 116 rejects high frequency noise components in the amplified read signal, and prevents aliasing, in a known manner. The phase update component 168 and gain update component 170 blocks illustrate that the signals from FIR filter 122 are used to adaptively adjust loop gain and sample timing in a known manner.

FIR filter 122 includes first FIR filter component 172, second FIR filter component 174, and FIR adaptation component 176. It has been observed that the PR polynomial representing an $E^2PR4$ channel can be represented as PR4 polynomial of the form (1−D) followed by a polynomial of the form (1+2D +$D^2$). Thus, FIR filter component 172 is configured to equalize the input signal to the PR4 channel target. The output of FIR filter component 172 is provided to the second FIR filter component 174 which equalizes the output of component 172 to the (1+2D +$D^2$) target. The effect of this is to provide Viterbi, detector 124 with an equalized sample, which is equalized to the PR polynomial corresponding to the $E^2PR4$ polynomial.

FIR adaptation component 176 preferably implements a least-mean-square (LMS) algorithm in a known manner. In other words, FIR adaptation component 176 adapts the coefficients, to find optimal coefficient values based on a predetermined parameter, such as the square of the error. In doing this, FIR adaptation component 176 finds values for the coefficients which minimize the square of the error.

A simplified Viterbi detector, as described above, can also be implemented for higher order PR4 channels, such as an $E^3PR4$ channel, resulting in an $E^3PR4/DF$ channel detector. The pulse response for an $E^3PR4$ channel is given by:

$$f(D)=1+3D+2D^2-2D^3-3D^4-D^5 \qquad \text{(Eq. 9)}$$

Removing the last ISI component (the $D^5$ component) of the above polynomial has an even smaller impact on the performance of the detector, since a smaller percentage of the energy of the channel pulse response is subtracted. In fact, removing that term results in a reduction of only 1/28 of the total channel energy. The minimum Euclidean distance for an uncoded $E^3PR4$ channel which is due to tribit error events is $\sqrt{48}$. With MTR codes, $d_{min}$ is increased to $\sqrt{112}$ denoting a gain of about 3.68 DB over an uncoded system. The gain is reduced to about 3.52 DB for an $E^3PR4/DF$ channel, since the minimum distance is now $\sqrt{108}$. Again, the gain may be slightly lower due to error propagation effects. However, implementing the $E^3PR4$ /DF channel instead of a conventional $E^3PR4$ -channel results in a Viterbi detector which requires only, at most, 16 states, rather than 32 states.

The branch metrics for such a 16 state $E^3PR4$ /DF trellis are listed in Table 2. Branches which violate the MTR=2 modulation code are again marked in the Table. Specifically, the two states denoted by +/−(1, −1, 1, −1) are removed from the trellis structure. With a TV-MTR code, the trellis structure is pruned so that it allows for the presence of tribits at alternate time intervals. Specifically, two states are removed at every other time interval. In those same time intervals, other branch metrics marked by + can also be ignored since earlier enforcement of the MTR constraint prevents the occurrence of these patterns.

construct a time-invariant detector is to process samples of the received samples at each step, where M is an even integer. The detector then operates at 1/M of the clock rate and releases M bits at each processing step. The code constraints at both odd and even times can now be enforced at every processing step in the trellis structure associated with the Viterbi detector. Block processing of the equalized samples has an additional advantage when using the technique discussed above to simplify the Viterbi detector. This is because the value of the term whose ISI contribution (the value of the $a_{k-4}$ term in an $E^2PR4$ channel) which is to be subtracted by local feedback is known because samples are being processed at a rate of two or more samples simultaneously.

In order to better illustrate this point, consider a radix-4 (i.e., M=2) architecture for a TV-MTR coded $E^2PR4/DF$ channel. Assume that, for a full rate detector, at time k-1, the presence of a tribit is allowed. Therefore, transitions between states 2 and 5 (shown in FIG. 4) are permitted. In the next time interval, these two branches are removed since the tribit pattern is now disallowed. In a radix-4 architecture, the trellis is constructed for processing samples at times k-1 and k simultaneously. Generally, each ACS unit of the Viterbi detector thus operates on four branches.

$$B_k^0 = 0 \quad B_k^6 = -3y_k + 9 \quad B_k^{10} = -5y_k + 25$$
$$B_k^2 = -y_k + 1 \quad B_k^{-6} = 3y_k + 9 \quad B_k^{-10} = 5y_k + 25$$
$$B_k^{-2} = y_k + 1 \quad B_k^8 = -4y_k + 16 \quad B_k^{12} = -6y_k + 36$$
$$B_k^4 = -2y_k + 4 \quad B_k^{-8} = 4y_k + 16 \quad B_k^{-12} = 6y_k + 36$$
$$B_k^{-4} = 2y_k + 4$$

| State Index | State $(a_{k-1}, a_{k-2}, a_{k-3}, a_{k-4})$ | $m_1$ | $a_{k-5}=1$ $d_k$ | $\Delta_k^{m1,n}$ | $a_{k-5}=-1$ $d_k$ | $\Delta_k^{m1,n}$ | $m_2$ | $a_{k-5}=1$ $d_k$ | $\Delta_k^{m2,n}$ | $a_{k-5}=-1$ $d_k$ | $\Delta_k^{m2,n}$ |
|---|---|---|---|---|---|---|---|---|---|---|---|
| 0 | (1, 1, 1, 1) | 0 | 0 | $B_k^{-2}$ | -2 | $B_k^0$ | 1 | 6 | $B_k^6$ | 8 | $B_k^8$ |
| 1 | (1, 1, 1, -1) | 2 | 4 | $B_k^4$ | 6 | $B_k^6$≠ | 3 | 10 | $B_k^{10}$ | 12 | $B_k^{12}$ |
| 2 | (1, 1, -1, 1) | 4 | -4 | $B_k^{-4}$ | -2 | $B_k^{-2}$ | 5 | 2 | $B_k^{2*}$ | 4 | $B_k^{4*}$ |
| 3 | (1, 1, -1, -1) | 6 | 0 | $B_k^0$ | 2 | $B_k^2$ | 7 | 6 | $B_k^6$ | 8 | $B_k^8$ |
| 4 | (1, -1, 1, 1) | 8 | -6 | $B_k^{-6}$ | -4 | $B_k^{-4}$ | 9 | 0 | $B_k^0$ | 2 | $B_k^2$ |
| 5* | (1, -1, 1, -1) | 10 | -2 | $B_k^{-2*}$ | 0 | $B_k^{0*}$ | 11 | 4 | $B_k^{4*}$ | 6 | $B_k^{6*}$ |
| 6 | (1, -1, -1, 1) | 12 | -10 | $B_k^{-10}$ | -8 | $B_k^{-8}$ | 13 | -4 | $B_k^{-4}$≠ | -2 | $B_k^{-2}$ |
| 7 | (1,-1, -1, -1) | 14 | -6 | $B_k^{-6}$ | -4 | $B_k^{-4}$ | 15 | 0 | $B_k^0$ | 2 | $B_k^2$ |
| 8 | (-1, 1, 1, 1) | 0 | -2 | $B_k^{-2}$ | 0 | $B_k^0$ | 1 | 4 | $B_k^4$ | 6 | $B_k^6$ |
| 9 | (-1, 1, 1, -1) | 2 | 2 | $B_k^2$ | 4 | $B_k^4$≠ | 3 | 8 | $B_k^8$ | 10 | $B_k^{10}$ |
| 10* | (-1, 1, -1, 1) | 4 | -6 | $B_k^{-6*}$ | -4 | $B_k^{-4*}$ | 5 | 0 | $B_k^{0*}$ | 2 | $B_k^{2*}$ |
| 11 | (-1, 1, -1, -1) | 6 | -2 | $B_k^{-2}$ | 0 | $B_k^0$ | 7 | 4 | $B_k^4$ | 6 | $B_k^6$ |
| 12 | (-1, -1, 1, 1) | 8 | -8 | $B_k^{-8}$ | -6 | $B_k^{-6}$ | 9 | -2 | $B_k^{-2}$ | 0 | $B_k^0$ |
| 13 | (-1, -1, 1, -1) | 10 | -4 | $B_k^{-4*}$ | -2 | $B_k^{-2*}$ | 11 | 2 | $B_k^2$ | 4 | $B_k^4$ |
| 14 | (-1, -1, -1, 1) | 12 | -12 | $B_k^{-12}$ | -10 | $B_k^{-10}$ | 13 | -6 | $B_k^{-6}$≠ | -4 | $B_k^{-4}$ |
| 15 | (-1, -1, -1, -1) | 14 | -8 | $B_k^{-8}$ | -6 | $B_k^{-6}$ | 15 | -2 | $B_k^{-2}$ | 0 | $B_k^0$ |

The $E^3PR4$ /DF channel represented by Table 2 requires the computation of 12 non-zero branch metrics. The branch metrics given by (+/−$y_k$+1, +/−2$y_k$+4, +/−3$y_k$+9, +/−4$y_k$+16, +/−5$y_k$+25 and +/−6$y_k$+36) d to be computed for the $E^3PR4$ /DF Viterbi detector each time interval.

The simplified Viterbi detectors can also be d in a radix-4 Viterbi detector implementation, or other similar implementation, in which time varying code constraints are implemented in a detector having a time-invariant structure. For instance, a Viterbi detector used on a channel with a TV-MTR code is inherently time variant. One way to However, two incoming branches to states 2 and 5 include branches which point to a tribit which starts at time k. These two metrics are discarded and need not be computed because they would violate the TV-MTR code constraints. Therefore the ACS units for these two states operate on only two branches. Further, in order to remove a contribution associated with the last ISI term, using local feedback at time k-1, the value of the term $a_{k-5}$ for each state needs to be taken from the survivor memory in the associated. trellis path. At time k, however, the value of $a_{k-4}$ is inherently assumed for each branch and can be used in the metric computation.

| To State | From State | $(d'_{k-1}, d'_k)$; | | $a_{k-5} = 1$ | | $a_{k-5} = -1$ | |
|---|---|---|---|---|---|---|---|
| N | M | $a_{k-4}$ | $(d_{k-1}, d_k)$ | $\Delta_k^{m_1,n}$ | $(d_{k-1}, d)$ | $\Delta_k^{m_1,n}$ | |
| 0 | 0 | (1, 1); 1 | (0, 0) | $B_{k-1}^0 + B_k^0$ | (2, 0) | $B_{k-1}^2 + B_k^0$ | |
| (+1, +1, +1) | 1 | (5, 1); 1 | (4, 0) | $B_{k-1}^4 + B_k^0$ | (6, 0) | $B_{k-1}^6 + B_k^0$ | |
| | 2 | (1, 5); 1 | (0, 4) | $B_{k-1}^0 + B_k^4$ | (2, 4) | — | |
| | 3 | (5, 5); 1 | (4, 4) | $B_{k-1}^4 + B_k^4$ | (6, 4) | $B_{k-1}^6 + B_k^4$ | |
| 1 | 4 | (-3, 1); 1 | (-4, 0) | $B_{k-1}^{-4} + B_k^0$ | (-2, 0) | $B_{k-1}^{-2} + B_k^0$ | |
| (+1, +1, -1) | 5 | (1, 1); 1 | (0, 0) | $B_{k-1}^0 + B_k^0$ | (2, 0) | $B_{k-1}^2 + B_k^0$ | |
| | 6 | (-3, 5); 1 | (-4, 4) | $B_{k-1}^{-4} + B_k^4$ | (-2, 4) | $B_{k-1}^{-2} + B_k^4$ | |
| | 7 | (1, 5); 1 | (0, 4) | $B_{k-1}^0 + B_k^4$ | (2, 4) | $B_{k-1}^2 + B_k^4$ | |
| 2 | 0 | (-1, -3); -1 | (-2, -2) | $B_{k-1}^{-2} + B_k^{-2}$ | (0, -2) | $B_{k-1}^0 + B_k^{-2}$ | |
| (+1, -1, +1) | 1 | (3, -3); -1 | (2, -2) | $B_{k-1}^2 + B_k^{-2}$ | (4, -2) | $B_{k-1}^4 + B_k^{-2}$ | |
| 3 | 4 | (-5, -3); -1 | (-6, -2) | $B_{k-1}^{-6} + B_k^{-2}$ | (-4, -2) | $B_{k-1}^{-4} + B_k^{-2}$ | |
| (+1, -1, -1) | 5 | (-1, -3); -1 | (-2, -2) | — | (0, -2) | $B_{k-1}^0 + B_k^{-2}$ | |
| | 6 | (-5, 1); -1 | (-6, 2) | $B_{k-1}^{-6} + B_k^2$ | (-4, 2) | $B_{k-1}^{-4} + B_k^2$ | |
| | 7 | (-1, 1); -1 | (-2, 2) | $B_{k-1}^{-2} + B_k^2$ | (0, 2) | $B_{k-1}^0 + B_k^2$ | |
| 4 | 0 | (1, -1); 1 | (0, -2) | $B_{k-1}^0 + B_k^{-2}$ | (2, -2) | $B_{k-1}^2 + B_k^{-2}$ | |
| (-1, +1, +1) | 1 | (5, -1); 1 | (4, -2) | $B_{k-1}^4 + B_k^{-2}$ | (6, -2) | $B_{k-1}^6 + B_k^{-2}$ | |
| | 2 | (1, 3); 1 | (0, 2) | $B_{k-1}^0 + B_k^2$ | (2, 2) | — | |
| | 3 | (5, 3); 1 | (4, 2) | $B_{k-1}^4 + B_k^2$ | (6, 2) | $B_{k-1}^6 + B_k^2$ | |
| 5 | 6 | (-3, 3); 1 | (-4, 2) | $B_{k-1}^{-4} + B_k^2$ | (-2, 2) | $B_{k-1}^{-2} + B_k^2$ | |
| (-1, +1, -1) | 7 | (1, 3); 1 | (0, 2) | $B_{k-1}^0 + B_k^2$ | (2, 2) | $B_{k-1}^2 + B_k^2$ | |
| 6 | 0 | (-1, -5); -1 | (-2, -4) | $B_{k-1}^{-2} + B_k^{-4}$ | (0, -4) | $B_{k-1}^0 + B_k^{-4}$ | |
| (-1, -1, +1) | 1 | (3, -5); -1 | (2, -4) | $B_{k-1}^2 + B_k^{-4}$ | (4, -4) | $B_{k-1}^4 + B_k^{-4}$ | |
| | 2 | (-1, -1); -1 | (-2, 0) | $B_{k-1}^{-2} + B_k^0$ | (0, 0) | $B_{k-1}^0 + B_k^0$ | |
| | 3 | (3, -1); -1 | (2, 0) | $B_{k-1}^2 + B_k^0$ | (4, 0) | $B_{k-1}^4 + B_k^0$ | |
| 7 | 4 | (-5, -5); -1 | (-6, -4) | $B_{k-1}^{-6} + B_k^{-4}$ | (-4, -4) | $B_{k-1}^{-4} + B_k^{-4}$ | |
| (-1, -1, -1) | 5 | (-1, -5); -1 | (-2, -4) | — | (0, -4) | $B_{k-1}^0 + B_k^{-4}$ | |
| | 6 | (-5, -1); -1 | (-6, 0) | $B_{k-1}^{-6} + B_k^0$ | (-4, 0) | $B_{k-1}^{-4} + B_k^0$ | |
| | 7 | (-1, -1); -1 | (-2, 0) | $B_{k-1}^{-2} + B_k^0$ | (0, 0) | $B_{k-1}^0 + B_k^0$ | |

Table 3 shows branch metrics for a radix-4 ion of an $E^2$PR4/DF channel. While, in a implementation of the Viterbi detector for this channel, the number of states switches between 16 and 14. In the radix-4 implementation, a 14-state time-invariant detector can be constructed. Similar block processing operations can be applied to $E^3$PR4 /DF detectors, and can be easily extended to other higher order channels and to cases where M is greater than 2.

| Channel | # non-zero branch metrics | Number of States | | |
|---|---|---|---|---|
| | | (0, k) RLL | (2; k) MTR | (2/3; k) MTR |
| EPR4 | 4 | 8 | 8* | 8/8** |
| $E^2$PR4 | 6 | 16 | 14 | 14/16 |
| $E^2$PR4/DF | 6 | 8 | 8* | 8/8** |
| $E^3$PR4 | 12 | 32 | 26 | 28/28 |
| $E^3$PR4/DF | 12 | 16 | 14 | 14/16 |

Table 4 compares the number of states, path metrics, and non-zero branch metrics for several RLL and MTR-coded channels discussed in the present application. The requirements for an RLL EPR4 channel is also shown for comparison. The RLL code is specified as (0, k) where 0 and k denote the minimum and maximum number of zeros between consecutive ones, respectively. The time-varying MTR code is specified as (2/3; k) where the notation highlights the fact that the maximum number of transitions alternates between 2 and 3. The k denotes the maximum number of zeros between consecutive ones. The single asterisks in Table 4 illustrate that two branches which correspond to the presence of tribits are removed from the corresponding trellis structure. The double asterisks in Table 4 indicate that two branches are removed at alternate time intervals from the corresponding trellis structure.

As Table 4 illustrates, the decision feedback simplified detectors in accordance with the present invention reduce the number of states by half for RLL coded channels, and by nearly half for MTR coded channels.

Thus, it can be seen that the present invention greatly reduces the complexity of higher order PR4 channels, without significantly reducing the channel energy associated therewith. By removing the contribution of a last ISI term in the channel pulse response, the number of states in a corresponding Viterbi detector is generally cut in half, while the channel energy is only slightly reduced.

The present invention includes a detector 124 for detecting data received from magnetic storage channel 100 having a channel pulse response represented by a polynomial including ISI terms. The detector includes a Viterbi detector 124 corresponding to a trellis structure 134 having states connected by branches having associated branch metrics.

In one embodiment, Viterbi detector 124 includes a branch metric calculator component 144 configured to calculate the branch metrics associated with each of the plurality of branches by removing a contribution to the branch metrics associated with a predetermined one of the ISI terms (such as the $a_{k-4}$ term).

In another embodiment, the magnetic storage channel 100 includes an equalizer 122 equalizing the data received to a channel pulse response target represented by the polynomial to provide an equalized sample. The Viterbi detector includes a predetermined ISI feedback component 136, 140 coupled to the branch metric calculator component 144. The equalizer 122 receives an input data sample and provides the equalized sample having a value adjusted to accommodate the input sample for ISI effects of samples received a number of time periods previously, the number corresponding to an order of the polynomial. The branch metric calculator component 144 removes the ISI affects on the equalized sample prior to calculating the branch metric.

The present invention can also be implemented as a method of detecting data received from a magnetic storage channel 100 having a channel pulse response target represented by a polynomial including ISI terms. The method includes providing a Viterbi detector 124 corresponding to a trellis structure 134 having a plurality of states connected by branches having associated branch metrics. The method further includes receiving an equalized data sample, equalized to the channel pulse response target, and calculating the branch metrics associated with each of the plurality of branches by removing a contribution to the branch metrics associated with a predetermined ISI term.

In one illustrative embodiment, the method calculates the branch metrics by combining the equalized sample with the desired value associated with the branch metric and removing the predetermined ISI term from the equalized sample prior to the combining step.

In another illustrative embodiment, the step of combining the predetermined ISI term with a desired value includes subtracting the predetermined term from the desired value.

In another illustrative embodiment, the equalized sample is based on an input data sample, and the equalized sample has a value adjusted to accommodate the input sample for ISI effects of samples received L time periods previously, where L is an order of the polynomial. In such an embodiment, the step of calculating the branch metrics includes removing the ISI affects on the equalized sample.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular channel pulse response target and code constraints while maintaining substantially the same functionality without departing from the scope and spirit of the present invention.

What is claimed is:

1. A detector for detecting data received from a magnetic storage channel having a channel pulse response represented by a polynomial including intersymbol interference (ISI) terms, the detector comprising:
   a Viterbi detector corresponding to a trellis structure having states connected by branches having associated branch metrics, the Viterbi detector including a branch metric calculator component configured to calculate the branch metrics associated with each of the plurality of branches by removing a contribution to the branch metrics associated with at least one of the ISI terms in the polynomial which is of order greater than three.

2. The detector of claim 1 wherein the magnetic storage channel includes an equalizer equalizing the data received to a channel pulse response target represented by the polynomial to provide an equalized sample, and wherein the Viterbi detector comprises:
   an ISI term feedback component, coupled to the branch metric calculator component.

3. The detector of claim 2 wherein the ISI feedback component is configured to provide the ISI term to the branch metric calculator component.

4. The detector of claim 3 wherein the equalizer receives an input data sample and provides the equalized sample having a value adjusted to accommodate the input sample for ISI affects of samples received a number of time periods previously the number of time periods corresponding to a number of the ISI terms in the polynomial, and wherein the branch metric calculator component removes the ISI affects on the equalized sample prior to calculating the branch metric.

5. A detector for detecting data received from a magnetic storage channel having a channel pulse response target represented by a higher order polynomial including intersymbol interference (ISI) terms, the detector comprising:
   a Viterbi detector detecting the data encoded according to a time-varying maximum transition run constraint, and corresponding to a trellis structure having a plurality of states connected by branches having associated branch metrics, the Viterbi detector including a branch metric calculator component configured to calculate the branch metrics associated with each of the plurality of branches by removing a contribution to the branch metrics associated with a predetermined one of the ISI terms in the higher order polynomial, wherein the data is encoded in symbols and wherein the channel exhibits a channel energy indicative of a minimum distance between the symbols, each of the ISI terms contributing to the channel energy, and wherein a majority of the channel energy remains after removal of the predetermined ISI term.

6. The detector of claim 5 wherein removal of the predetermined ISI term reduces the channel energy by an amount at least as small as removal of any other of the ISI terms.

7. The detector of claim 6 wherein the predetermined ISI term corresponds to a highest order term in the polynomial.

8. The detector of claim 7 wherein the predetermined ISI term corresponds to an ISI component contributed by a data sample received by the detector L time periods previously.

9. The detector of claim 5 wherein the magnetic storage channel includes an equalizer equalizing the data to the channel pulse response target to provide an equalized sample, and wherein the Viterbi detector comprises:
   a predetermined ISI term feedback component, coupled to the branch metric calculator component.

10. The detector of claim 9 wherein the predetermined ISI feedback component is configured to provide the predetermined ISI term to the branch metric calculator component.

11. The detector of claim 10 wherein the equalizer receives an input data sample and provides the equalized sample having a value adjusted to accommodate the input sample for ISI affects of samples received a number of time periods previously, the number corresponding to an order of the polynomial, and wherein the branch metric calculator component removes the ISI affects on the equalized sample prior to calculating the branch metric.

12. A method of detecting data received from a magnetic storage channel having a channel pulse response target represented by a polynomial having an order in excess of three and including intersymbol interference (ISI) terms, the method comprising the steps of:
   providing a Viterbi detector corresponding to a trellis structure having a plurality of states connected by branches having associated branch metrics;
   receiving an equalized data sample encoded according to a maximum transition run constraint, and equalized to the channel pulse response target which is represented by the polynomial having an order in excess of three; and
   calculating the branch metrics associated with each of the plurality of branches by removing a contribution to the branch metrics associated with a predetermined one of the ISI terms.

13. The method of claim 12 wherein the calculating step comprises the steps of:
    combining the equalized sample with a desired value associated with the branch metric; and
    removing the predetermined ISI term from the equalized sample prior to the combining step.

14. The method of claim 12 wherein the calculating step comprises the steps of:
    combining the equalized sample with a desired value associated with the branch metric; and
    combining the predetermined ISI term with the desired value to accommodate for the predetermined ISI term in the desired value prior to the combining step.

15. The method of claim 14 wherein the step of combining the predetermined ISI term with the desired value comprises the step of:
    subtracting the predetermined ISI term from the desired value.

16. The method of claim 12 wherein the data is encoded in symbols and wherein the channel exhibits a channel energy, each of the ISI terms contributing to the channel energy, and wherein the calculating step comprises the step of:
    removing the contribution to the branch metric contributed by the predetermined ISI term which comprises a highest order term in the polynomial.

17. The method of claim 12 wherein the polynomial is an L order polynomial and wherein the calculating step comprises the step of:
    removing the contribution to the branch metric contributed by the predetermined ISI term which corresponds to an ISI component contributed by a data sample received by the detector L time periods previously.

18. The method of claim 12 wherein the polynomial is an L order polynomial and wherein the equalized sample is based on an input data sample and wherein the equalized sample has a value adjusted to accommodate the input sample for ISI affects of samples received L time periods previously and wherein the calculating step comprises the step of:
    removing the ISI affects on the equalized, sample.

* * * * *

UNITED STATES PATENT AND TRADEMARK OFFICE
CERTIFICATE OF CORRECTION

PATENT NO. : 6,201,840 B1
DATED : March 13, 2001
INVENTOR(S) : Rub et al.

It is certified that error appears in the above-identified patent and that said Letters Patent is hereby corrected as shown below:

<u>Equations,</u>
<u>Column 8,</u>
Table 1, line 45, row 9, "-3" should be -- -2 --.

<u>Column 8,</u>
Line 57, " ''' " should be -- $^m$ --.

<u>Column 18,</u>
Line 21, delete "," after equalized.

Signed and Sealed this

Fourteenth Day of May, 2002

Attest:

JAMES E. ROGAN
*Attesting Officer*  *Director of the United States Patent and Trademark Office*